United States Patent [19]

Gissinger et al.

[11] Patent Number: 5,347,099
[45] Date of Patent: Sep. 13, 1994

[54] METHOD AND DEVICE FOR THE ELECTRIC WELDING OF SHEETS OF MULTILAYER STRUCTURE

[75] Inventors: Frank Gissinger, Dunkerque; Thierry Gheysens, Oudezeele, both of France

[73] Assignee: Sollac, Puteaux, France

[21] Appl. No.: 26,689

[22] Filed: Mar. 4, 1993

[30] Foreign Application Priority Data

Mar. 5, 1992 [FR] France ................ 92 02666

[51] Int. Cl.⁵ .................. B23K 11/08; B23K 11/06
[52] U.S. Cl. ............................ 219/81; 219/84; 219/118
[58] Field of Search ............ 219/81, 82, 83, 84, 219/117.1, 118, 91.21, 78.16; 428/624, 625, 626

[56] References Cited

U.S. PATENT DOCUMENTS

| | | | |
|---|---|---|---|
| 2,957,975 | 10/1960 | Pearson | 219/81 |
| 3,281,569 | 10/1966 | Bachofner | 219/84 |
| 3,489,446 | 1/1970 | Williams | 219/91.21 |
| 3,614,374 | 10/1971 | Williams | 219/91.21 |
| 3,881,083 | 4/1975 | Bromley | 219/84 |
| 4,650,951 | 3/1987 | Koga et al. | 219/118 |

FOREIGN PATENT DOCUMENTS

| | | |
|---|---|---|
| 2137784 | 2/1972 | Fed. Rep. of Germany ... 219/91.21 |
| 2638668 | 5/1990 | France . |
| 58-97486 | 6/1983 | Japan . |

*Primary Examiner*—Geoffrey S. Evans
*Attorney, Agent, or Firm*—Oblon, Spivak, McClelland, Maier & Neustadt

[57] ABSTRACT

Methods and device for the electric welding of at least two sheets of multilayer structure (2,5), termed sandwich sheets, each including at least two metal sheets interconnected by a film of polymer. The method includes putting the inner faces (3a, 7a) of the sandwich sheets (2,5) into contact in a partial overlapping region, applying on the opposite faces (4a, 6a) of the sandwich sheets at least two rollers each having two parts and placed in confronting relation to each other in alignment with the overlapping region, supplying electric power to at least the second part of each roller (9,10), exerting a clamping force on the overlapping region of the sandwich sheets (2,5) using the rollers so as to bring the second part of each of the rollers into contact with the inner face of the confronting sandwich sheet and shifting the rollers (9,10) along the overlapping region.

19 Claims, 3 Drawing Sheets

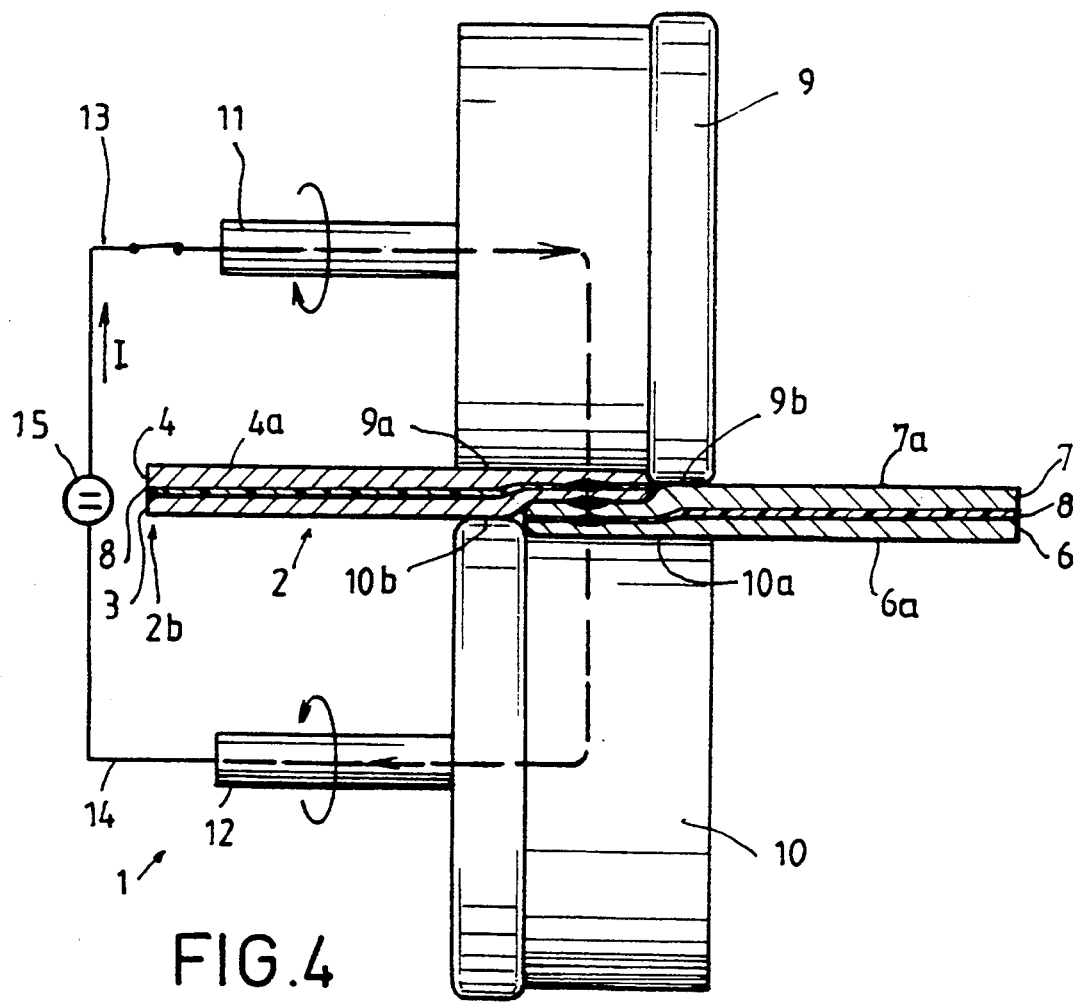

METHOD AND DEVICE FOR THE ELECTRIC WELDING OF SHEETS OF MULTILAYER STRUCTURE

The present invention relates to a method for the electric welding of sheets of multilayer structure, termed sandwich sheets, and to a device for carrying out this method.

In various industries and in particular in the automobile industry, sandwich sheets are employed, for example for making engine sumps or pans and floors of automobile vehicles to provide an acoustic insulation.

Sandwich sheets consist of a multilayer structure in which two metal sheets are interconnected by a film of polymer which is an electric insulator.

Up to the present time, for the purpose of welding together two sandwich sheets they are first of all made to overlap, i.e. superimposed, then they are inserted between two electrodes, namely an upper electrode and lower electrode of copper or a copper alloy, arranged along a welding axis which is perpendicular to the largest sides of the sandwich sheets.

In order to ensure that the electric current flows from one electrode to the other, the sheet of the first multilayer structure which faces the upper electrode is electrically connected by a bridge member to the sheet of the second multilayer structure which faces the lower electrode so as to create a bypass current from one sheet to the other.

In the course of the welding operation, the two multilayer structures are clamped together by a given force exerted by the electrodes, and an electric current simultaneously flows from one electrode to the other.

The passage of a high current in the metal sheets, namely of the order of 15 KA at a potential difference of 2 volts, produces by the Joule effect a heating in the two multilayer structures which tends to soften the polymer films.

Under the effect of the thermal and mechanical stresses there occur, on one hand, the flow of the polymer and, the other hand, when the sheets of the same multilayer structure come into contact, the passage of the current.

Owing to the presence of an ohmic resistance at the interface of the sheets, a localized heating is produced which causes the metal to melt and a spot weld is formed at each interface after the current has been turned off and the molten core has solidified.

If the current is very high and the welding is effected rapidly a single spot weld is created instead of three.

However, this welding method is unsatisfactory for the applications envisaged in the automobile industry, since it does not permit the welding of sheets of multilayer structure placed end to end.

An object of the present invention is to overcome this drawback by providing an electric welding method and device which are particularly well adapted to sandwich sheets and to their utilization in the automobile industry.

The present invention therefore provides a method for the electric welding of at least two sheets having multilayer structures, termed sandwich sheets, each of which comprises at least two metal sheets interconnected by a film of polymer, characterized in that it comprises:

putting said sandwich sheets in a partly overlapping position, putting the faces, termed inner faces, of the sandwich sheets in contact in said overlapping region, applying on the opposite faces, termed outer faces, of the sandwich sheets at least two rollers each formed by two parts and disposed in confronting relation in alignment with the overlapping region, a first part of each roller bearing by its surface of contact on the outer face of one of said sandwich sheets, a second part of each roller, which projects relative to said first part, being electrically conductive and disposed in confronting relation to the inner face of the other of said sandwich sheets, supplying electric power to at least the second part of each roller, exerting by means of the rollers a clamping force on the overlapping region of the sandwich sheets so as to bring the second part of each of said rollers into contact with the inner face of the confronting sandwich sheet, and moving said rollers along the overlapping region.

According to other features of the invention:

the first part of each roller is also electrically conductive, the first part of each roller is electrically insulated, the method comprises exerting, prior to the application of the first parts of the rollers on the outer faces of the sandwich sheets, a bending force on the end of a sandwich sheet opposed to the overlapping region so as to bring said sandwich sheets into the same plane, the overlapping region has a width which is between about 1.5 and 2 times the thickness of a sandwich sheet.

The invention also provides a device for the electric welding of at least two sheets of multilayer structure, termed sandwich sheets, for carrying out the aforementioned method characterized in that it comprises:

at least two rollers each having a first part adapted to be applied against the face, termed outer face, of one of the sandwich sheets and a second part which projects relative to the first part, is electrically conductive and adapted to be put into contact with the opposite face, termed inner face, of the other of the sandwich sheets, said sandwich sheets being partly overlapping and said rollers being placed in confronting relation to each other in alignment with the overlapping region of the sandwich sheets, means for supplying electric power to at least the second part of each roller, means for driving each roller in rotation, and means for shifting the rollers in a direction perpendicular to said sandwich sheets.

According to other features of the device according to the invention:

the first part of each roller is also electrically conductive, the first part of each roller is electrically insulated, the second part of the first roller is formed on a peripheral edge portion of said first roller and the second part of the second roller is formed on the opposite peripheral edge portion of said second roller, the two parts of each of the rollers have a generally substantially cylindrical shape, the second part of each roller has a width which is substantially equal to one third of the width of the corresponding roller, the second part of each roller has a diameter which is about 0.30 mm larger than the diameter of the first part of the corresponding roller, the second part of each roller forms at least one shoulder.

BRIEF DESCRIPTION OF THE DRAWINGS

Further features and advantages of the invention will be apparent from the following description which is given solely by way of example with reference to the accompanying drawing in which:

FIGS. 2, 3 and 4 are partial diagrammatic elevational views of the device showing the different steps in the welding of two sheets of multilayer structure.

Figure 1:
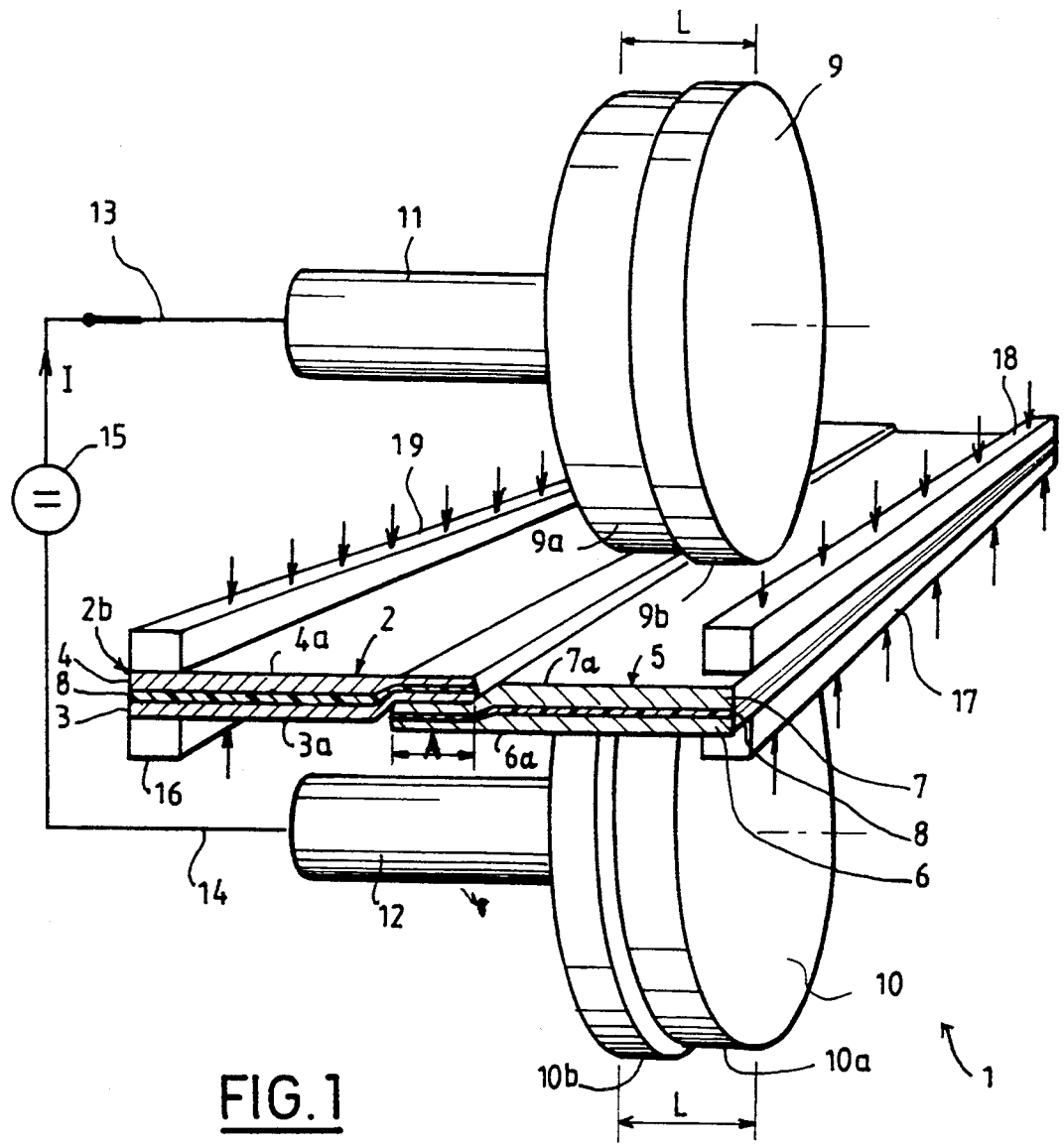
FIG. 1 is a diagrammatic perspective view of the electric welding device according to the invention.

The device shown in FIG. 1 is generally designated by the reference character 1 and is adapted to the electric welding of two sheets 2 and 5 of multilayer structure, termed sandwich sheets.

Each of these sandwich sheets 2 and 5 comprises two metal sheets respectively 3, 4 and 6, 7 having a thickness of 0.35 mm and interconnected by a film of polymer 8 having a thickness of for example 0.05 mm.

The total thickness of each sandwich sheet 2 and 5 is equal to 0.75 mm in the presently-described embodiment.

These sandwich sheets 2 and 5 are partly superimposed in an overlapping region A so as to bring a part of the face 3a, termed the inner face, of the sandwich sheet 2 into contact with a part of the face 7a, termed inner face, of the sandwich sheet 5 throughout the length of said sandwich sheets 2 and 5.

The overlapping region A has a width which is between 1.5 and 2 times the thickness of a sandwich sheet 2 or 5, i.e. in the presently-described embodiment a width equal to 1.5 mm.

The welding device comprises two rollers 9 and 10 of width L.

Each of the rollers 9 and 10 is carried by a driving shaft respectively 11 and 12 coupled to a motor (not shown) for driving each of said rollers in rotation at a linear velocity of about 3 m/min.

The shafts 11 and 12 are electrically interconnected by an electric connection 13 and 14 which is supplied with power by a generator 15 and extends axially through said shafts 11 and 12 to the rollers 9 and 10.

The generator 15 delivers an electric current of for example 10 KA at a voltage of 1 V, the passage of the electric current in the rollers 9 and 10 and the sandwich sheets 2 and 5 being symbolically represented in the Figures by the line designated by the reference character I.

A circuit (not shown) of cooling water is provided inside the rollers 9 and 10 to prevent deterioration of their contact surface.

The two rollers 9 and 10 are disposed on opposite sides of the two sandwich sheets 2 and 5 in superimposed and confronting relation to each other.

Thus, the upper roller 9 is placed in facing relation to the upper sandwich sheet 2 and symmetrically relative to the overlapping region A.

The lower roller 10 is placed in facing relation to the lower sandwich sheet 5 and symmetrically relative to the overlapping region A.

The upper roller 9 has a first part 9a of generally cylindrical shape adapted to be applied against the face 4a, termed outer face, of the sandwich sheet 2 and a second part 9b of generally cylindrical shape which projects relative to said first part 9a and is adapted to be put into contact with the opposite face 7a, termed the inner face, of the sandwich sheet 5.

The lower roller 10 has a first part 10a of generally cylindrical shape adapted to be applied against the face 6a, termed outer face, of the sandwich sheet 5 and a second part 10b having a generally cylindrical shape and projecting relative to said first part 10a and adapted to be put into contact with the opposite face 3a, termed the inner face, of the sandwich sheet 2.

The second projecting parts 9b and 10b are symmetrical and the second projecting part 10b of the lower roller 10 is formed on a peripheral portion of said roller, while the second projecting part 9b of the upper roller 9 is formed a peripheral edge portion opposed to the peripheral edge portion of the lower roller 10 having the second projecting part 10b.

Arranged symmetrically in this way relative to the overlapping region A, the rollers 9 and 10 do not come into contact with the inner face 3a and 7a of the sandwich sheets 2 and 5.

The second part 9b and 10b of each roller 9 and 10, respectively, has a width which is substantially equal to one third of the width L of the corresponding roller (9,10) and a diameter which is larger by about 0.30 mm than the diameter of the first part (9a,10a) of said corresponding roller (9,10).

The surface of contact of each second projecting part 9b and 10b is advantageously so chosen that the contact resistance between said surface and the inner face 3a and 7a of the confronting sandwich sheet is not too high.

Indeed, an excessive contact resistance would produce an untimely heating of the sandwich sheet and a deterioration of its surface.

The second projecting part 9b and 10b of each roller respectively 9 and 10 forms at least one shoulder.

The cylindrical rollers 9 and 10 may De shifted towards or away from each other by shifting means (not shown) constituted by hydraulic jacks.

Further, the device comprises a clamping set adapted to maintain the sandwich sheets 2 and 5 applied against each other in their partly overlapping position.

This clamping set comprises four bars, 16, 17, 18 and 19 for clamping the sandwich sheets 2 and 5 and disposed on each side of the unit consisting of the two rollers 9 and 10 and against each respective face 3a, 4a, 6a and 7a of said sandwich sheets.

In a first embodiment of the invention, the two parts 9a, 9b, 10a and 10b of each roller respectively 9 and 10 are electrically conductive.

The rollers 9 and 10 are made from a conductive material such as a copper, chromium and zirconium alloy.

Figure 2:
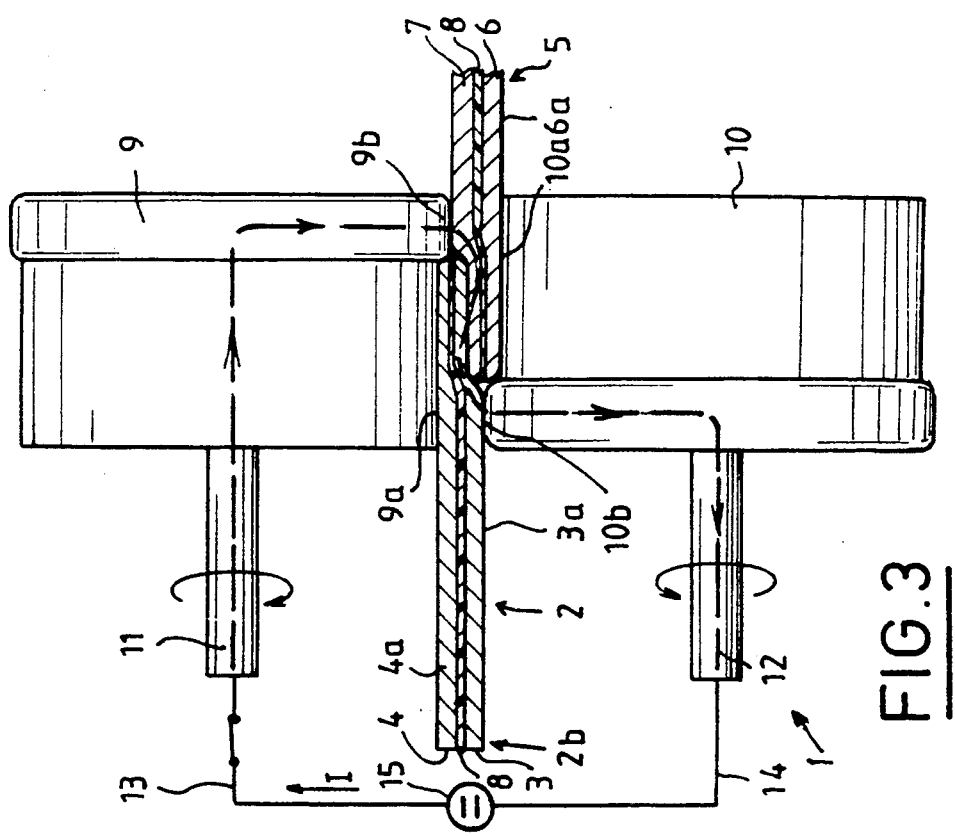

According to the method of the invention, the two sandwich sheets 2 and 5 are made to partly overlap and the faces 3a and 7a, termed inner faces, of the sandwich sheets 2 and 5 are put into contact in the overlapping region A (FIG. 2).

Then the two sandwich sheets 2 and 5 are clamped between the four bars 16, 17, 18 and 19.

In order to use the sandwich sheets 2 and 5 for example for making engine sumps or pans of automobile vehicles, each of said sandwich sheets must be located in the same horizontal plane after the welding operation.

Figure 3:
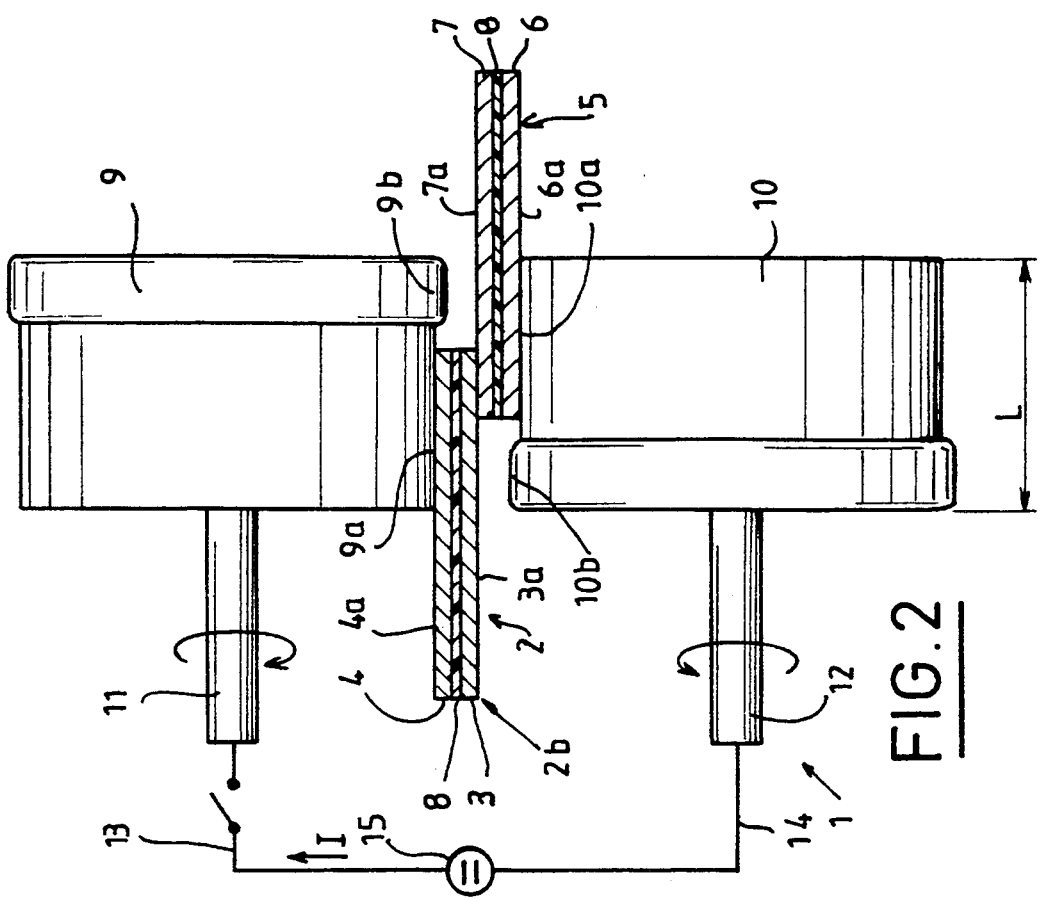

For this purpose, a bending force is exerted for example on the end 2b of the upper sandwich sheet 2 opposed to that participating in the overlapping, this force being directed downwardly and the resulting deflection being equal to the thickness of a sandwich sheet (FIG. 3).

Following on this operation, the rollers 9 and 10 are applied against the sandwich sheets 2 and 5 in such manner that the first part 9a and 10a of each roller 9 and 10 comes into contact respectively with the outer face 4a of the sandwich sheet 2 and with the outer face 6a of the sandwich sheet 5.

The clamping force applied on the sandwich sheets 2 and 5 by means of the first parts 9a and 10a of the rollers 9 and 10 crushes said sandwich sheets in the region of the overlapping region A until the projecting second parts 9b and 10b respectively of the rollers 9 and 10 come into contact with the inner faces respectively 7a and 3a of the sandwich sheets 5 and 2 (FIG. 3).

The electric current then takes the path from the upper roller 9 to the lower roller 10 by passing in succession through the inner face 7a of the lower sandwich sheet 5, the interface of the overlapping region A and the inner face 3a of the upper sandwich sheet 2 (FIG. 3).

As the ohmic resistance of the interface is higher than the contact resistance between the rollers 9 and 10 and the inner faces 3a and 7a of the sandwich sheets 2 and 5, the passage of the current produces a heating by the Joule effect which is propagated by conduction to the polymer films 8 of the two sandwich sheets 2 and 5 and thereby results in a flow of said films 8 and an electric contact between the two sheets 3, 4 and 5, 7 of each sandwich sheet 2 and 5.

Advantageously, the method according to the invention permits, by the presence of the second projecting parts 9b and 10b, opposing the ejection of the polymer from the sandwich sheets 2 and 5 upon the crushing, which therefore avoids altering the electric contact.

The rollers 9 and 10 travel along the overlapping region A and the weld is effected then at the interface between the two inner faces 3a and 7a of the sandwich sheets and at each sheet/sheet interface of the same sandwich sheet, by the melting of the metal and the creation of a molten core (FIG. 4).

The welding force is equal to about 300 DaN for a welding rate of about 3 m/min.

After the current has been turned off and the core has solidified, there are thus created three parallel weld beads or a single bead provided that a high current has been used.

In a second embodiment of the invention, the first parts 9a and 10a of each roller 9 and 10 are electrically insulated while the projecting second parts 9b and 10b are electrically conductive.

In order to electrically insulate the first parts 9a and 10a of each roller 9 and 10, it is possible to make them from a copper base alloy and to coat their surface adapted to be applied respectively against the outer faces 4a and 6a of the sandwich sheets 2 and 5.

It is also possible to make these parts 9a and 10a from a copper base alloy, supply electric current only to the second parts 9b and 10b of the rollers 9 and 10 and to interpose respectively between the first part 9a and 10a and the second part 9b and 10b of each roller 9 and 10 a disc of an electrically insulating material such as bakelite.

The parts 9a and 10b of each roller 9 and 10 may also be made from an electrically insulating material or a material having a very high electric resistivity.

The electric connections 13 and 14 supplied with power by a generator 15 extend through the shafts 11 and 12 to the projecting second parts 9b and 10b of each of the rollers 9 and 10.

The welding method of this second embodiment is substantially identical to that just described in respect of the first embodiment with reference to FIGS. 2 to 4.

The main feature of this embodiment relates to the fact that there is effected a permanent shunting of the electric current in the second projecting parts 9b and 10b of each roller 9 and 10 and that the clamping and welding functions are disassociated.

Advantageously, the present invention permits producing a fluidtight weld of high reliability, contrary to the method of the prior art which employed spot welding.

What is claimed is:

1. Method for the electric welding of at least two sheets that each have a multilayer structure, termed sandwich sheet, each sandwich sheet having at least two metal sheets that are mechanically interconnected by a film of polymer that is disposed between the at least two metal sheets, said method comprising the steps of:
partially overlapping first and second sandwich sheets,
contacting inner faces of the first and second sandwich sheets in said overlapping region,
positioning first and second rollers on first and second opposite regions of first and second outer faces of, respectively, the first and second sandwich sheets, each roller having first and second cylindrical regions with first and second cylindrical radii, the first cylindrical radii of each roller being smaller than the second cylindrical radii of the same roller, the fist and second rollers being positioned in confronting relation to each other in alignment with said overlapping region, wherein the second cylindrical region of the first roller opposes part of the first cylindrical region of the second roller and the second cylindrical region of the second roller opposed part of the first cylindrical region of the first roller, the second cylindrical regions of the first and second rollers being electrically conductive,
supplying electrical power to at least the second cylindrical regions of the first and second rollers,
exerting, by means of said rollers, a clamping force on said overlapping region of said first and second sandwich sheets thereby contacting the second region of the first roller to the inner surface of the second sandwich sheet and contacting the second region of the second roller to the inner surface of the second sheet, and
displacing said first and second rollers along said overlapping region.

2. Method according to claim 1, wherein the first region of each roller is also electrically conductive.

3. Method according to claim 1, wherein the first region of each roller is electrically insulated.

4. Method according to claim 1, further comprising the step of exerting, prior to the step of positioning said first and second rollers, a bending force on an end that is opposed to said overlapping region of one of the first and second sandwich sheets so as to bring non-overlapped portions of said first and second sandwich sheets into the same plane.

5. Method according to claim 1, wherein said overlapping region has a width of between 1.5 and 2 times the thickness of one of the first and second sandwich sheets.

6. Device for the electric welding of at least two sandwich sheets each of the first and second sandwich sheets having a multilayer structure, each of the first and second sandwich sheets comprising at least two metal sheets that are mechanically interconnected by a film of polymer,
comprising:
first and second rollers, each of the first and second roller having a first cylindrical region and a second cylindrical region, the first cylindrical region of each of the first and second rollers having a smaller radii than the radii of the second cylindrical region of the same sheet, the second cylindrical region of the first roller opposing part of the first cylindrical region of the second roller, the second cylindrical region of the first roller opposing part of the first cylindrical region of the second roller, the second regions of each of the first and second rollers being electrically conductive,
means for supplying electric power to at least said second part of each roller,
means for rotating each roller, and
means for displacing said rollers in a plane that is parallel to the axes of the first and second rollers and along a direction in the plane that is perpendicular to the axes.

7. Device according to claim 6, wherein said first region of each of the first and second rollers is also electrically conductive.

8. Device according to claim 6, wherein said first region of each of the first and second rollers is electrically insulated.

9. Device according to claim 6, wherein said second region of the first roller is formed on a peripheral edge portion of said first roller and said second region of the second roller is formed on an opposed peripheral edge portion of said second roller.

10. Device according to claim 6, wherein said second region of each of the first and second rollers has a length along the axial direction of the substantially equal to one third of the width of the corresponding roller.

11. Device according to claim 10, wherein the second region of each of the first and second rollers has a diameter exceeding by about 0.30 mm the diameter of said first region of the same roller.

12. Device according to claim 6, wherein the second region of each of the first and second rollers has a diameter exceeding by about 0.30 mm the diameter of said first region of the same roller.

13. Device according to claim 6, wherein said second region of each roller forms at least one shoulder.

14. Device according to claim 6, further comprising means for counter-rotating the first and second rollers.

15. Device according to claim 6, further comprising first and second sandwich sheets, wherein each sandwich sheet comprises first and second conducting layers that are electrically insulated from one another by an electrically insulating layer, a first end region of the first sandwich sheet opposes a first end region of the second sandwich sheet in a region that is between the opposing first cylindrical regions of the first and second rollers.

16. Device according to claim 15 wherein the second cylindrical regions of the first and second rollers electrically contact non-opposed regions of the first and second sandwich sheets, the non-opposed region of each sandwich sheet does not oppose the other one of the first and second sandwich sheets.

17. Device according to claim 16, further comprising means for pressing the first and second rollers against the first and second sandwich sheets to thereby bend the first and second sheets so that regions other than the first end regions of the first and second sandwich sheets are in the same place.

18. A method for the electric welding of at least two sheets that each have a multilayer structure, termed sandwich sheet, each sandwich sheet having at least two metal sheets that are mechanically interconnected by a film of polymer, comprising the steps of:
effecting a partial overlapping of said sandwich sheets to form an overlapping region of said sandwich sheets;
putting faces, termed inner faces, of said sandwich sheets in contact with one another in said overlapping region;
applying to opposite faces, termed outer faces, of said sandwich sheets, two rollers, each roller having first and second surface regions, the first and second rollers being in confronting relationship to one another and in alignment with said overlapping region, the first surface region of each of said rollers contacting an outer face of one of the sandwich sheets, the second surface region of each roller being displaced further towards the other roller than the first surface regions, the second surface region of each roller being electrically conductive and disposed in confronting relationship to the inner face the sandwich sheet which does not contact the first surface of same roller,
electrically supplying power to at least said second part of each roller,
exerting, by means of said rollers, a clamping force on said overlapping region of said sandwich sheets to bring said second part of each of said rollers in contact with said inner face of the confronting sandwich sheet, and shifting said rollers along said overlapping region.

19. A device for electric welding, comprising:
first and second electrode surfaces, each of the first and second electrode surfaces having a first electrode surface region and a second electrode surface region, the first electrode surface region of each of the first and second rollers forming a step relative to the second electrode surface region of the same sheet, the plane of the first electrode surface region is offset from the plane of the second electrode surface region, the second electrode surface region of the first electrode surface opposing part of the first electrode surface region of the second electrode surface, the second electrode surface region of the first electrode surface opposing part of the first electrode surface region of the second electrode surface, the second electrode surface regions of each of the first and second electrode surfaces being electrically conductive;
means for supplying electric power to the second electrode surface regions of the first and second electrode surfaces;
means for rotating the first electrode surface about a first axis;
means for rotating the second electrode surface about a second axis, wherein the first and second axes are parallel to one another and the direction of rotation of the first and second axes is opposite one another.

* * * * *